Sept. 15, 1959 J. C. DUDDY 2,904,611
GLASS FIBER TUBING
Filed Dec. 1, 1955

INVENTOR.
JOSEPH C. DUDDY
ATTORNEY

# United States Patent Office 2,904,611
Patented Sept. 15, 1959

2,904,611

GLASS FIBER TUBING

Joseph C. Duddy, Langhorne, Pa., assignor to The Electric Storage Battery Company, a corporation of New Jersey Application December 1, 1955, Serial No. 550,280

3 Claims. (Cl. 136—43)

This invention relates to porous tubing and particularly to porous glass fiber tubing and the method of manufacturing the same.

It is an object of this invention to provide a new porous glass fiber tubing and a method of making the same wherein the tubing will be particularly suited for use in the manufacture of tubular electrode elements for electric storage batteries. Commercial batteries of the tubular type include positive plates characterized by a lead alloy grid having a series of rod-like cores or spines each encased in a tube which retains a supply of lead oxide or other active material in contact with the spines. The tubes are usually made from hard rubber or polyethylene, or other acid resistant material, and are slotted to permit contact between the electrolyte and the active material. Such tubes are subject to limitation in capacity because they have low porosity and in life because they possess insufficient fatigue resistance, stress being applied by expansion of the active material, and, inadequate resistance to oxidation. Conventional porous or microporous tubes have the same life deficiency to perhaps a greater extent because the exposed surface is many times greater than in the slotted type of tube. In accordance with the present invention there is provided a porous tube formed from a sheet of porous glass fiber material rolled about an edge thereof into a plural layer tube, the outer layers of which are impregnated with a solution and bonded together leaving the remaining inner layers unbonded, or only partially bonded, to permit independent freedom in expansion or contraction thereof. Such porous tubing has the distinctive characteristics of being inexpensive, strong, rigid, inert, and continuously porous. The porous dimensional uniformity as well as dimensional stability at elevated temperatures accommodates the expansion and contraction of the active material without fatigue by reason of its plural layer construction and impregnation.

It is a further object of the invention to provide a method of making porous tubing comprising the steps of dipping a sheet of porous glass fiber material in a resinous solution for impregnation of the sheet, removing the impregnated sheet from the solution and drying it, rolling the sheet about an edge thereof to form a plural layer tube of predetermined diameter and heating the rolled tube to a predetermined temperature to bond together the outer layers of the tube.

For a more detailed disclosure of the invention and for further objects and advantages thereof, reference is to be had to the following description taken in conjunction with the accompanying drawings in which.

Figure 1:
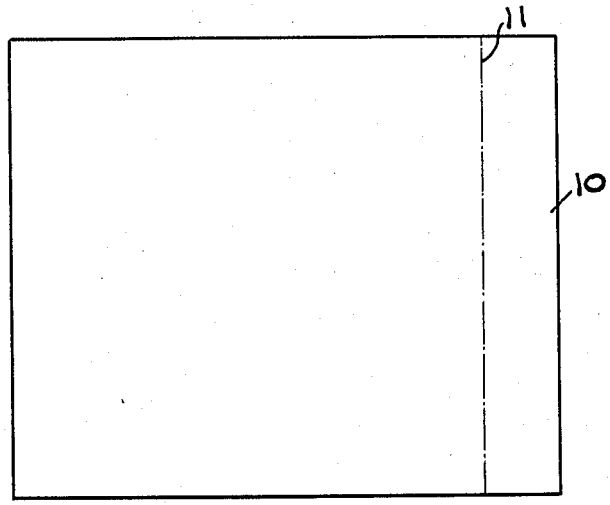
Fig. 1 illustrates a sheet of glass fiber material.
Figure 2:
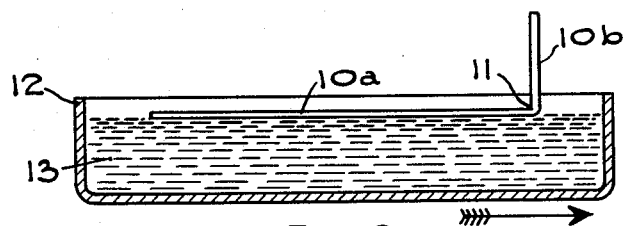
Fig. 2 is a schematic showing of a sheet of glass fiber material dipped in a solution in a dipping tank.

Referring to Fig. 1, the glass fiber sheet 10 is preferably cut in rectangular shape with a length corresponding to the desired length of the finished tubing and having a width controlled by the diameter of the finished tubing and the number of plies or layers desired. The sheet 10 is creased along a line 11 to divide the sheet into two sections. As the glass fiber sheet preferably includes a polystyrene binder, the sheet will act as an inert spring. Thus even though the sheet is creased, it will tend to spring back to its original shape upon removal of the creasing pressure. If the sheet 10 is held in a vertical plane as illustrated in Fig. 2, the lower section 10a may be moved laterally into a dipping tank 12 in which is disposed impregnating solution 13. The section 10a will assume an angular position of about 90 degrees with respect to the vertical section 10b of the sheet and will become impregnated with the solution contained in the tank 12. Due to the crease 11 and the large size pores in the sheet 10, the impregnating solution 13 will not rise beyond the crease line 11 in the vertical section 10b. By moving the impregnated sheet 10 in the direction of the arrow, Fig. 2, and over the left-hand edge of tank 12, the excess solution will be scraped from the treated section 10a by the tank edge. As the sheet 10 is removed from the tank 12, the treated section 10a will return to the same plane as the vertical section 10b.

Figure 3:
Fig. 3 is a schematic showing of a sheet of impregnated glass fiber material about to be rolled about an edge thereof and associated with a tubular mandrel.
Figure 4:
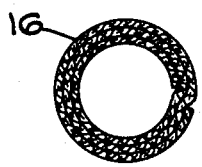
Fig. 4 is a detailed cross-sectional view through a plural layer porous glass fiber tube embodying the present invention.

The impregnating solution may comprise polystyrene and methyl-ethyl-ketone. For example, one sheet impregnating solution was comprised of 10% expandable polystyrene, 89¾% methyl-ethyl-ketone and about 0.25% Triton X–100, a surface active agent. As the methyl-ethyl-ketone is quite volatile, the impregnated section 10a of the glass fiber sheet 10 quickly dries in air to a sticky state and the sheet may be wrapped on the mandrel 14 as shown in Fig. 3. The mandrel 14 preferably is hollow and has a slot 18 into which the unimpregnated section 10b of the sheet is inserted. The sticky nature of the polystyrene resulting from incomplete evaporation of the solvent at the wrapping stage causes the outer plies or layers of the tube to stick together and retain the unimpregnated inner plies formed from section 10b without unraveling. The mandrel 14 with the glass fiber sheet 10 wrapped thereon is then passed into an elevated temperature zone where the residual solvent is evaporated and the tubing becomes rigid. Further elevation of the temperature to values of the order of 250° to 300° F. causes the polystyrene to "blow" producing a resin film discontinuity or porosity in the outer impregnated plies of the tube without detracting appreciably from the strength and rigidity of the outer plies. After cooling the tube is removed from the mandrel 14 and there results the finished multi-ply porous glass fiber tube 16 shown in Fig. 4. The strength and rigidity of the tubing 16 results from the impregnated outer plies whereas accommodation for expansion and contraction of the active material is provided by the springy nature of the unimpregnated inner plies or layers.

Greater strength and rigidity can be obtained by raising the proportion of resin in the impregnating solution. For applications not requiring a springy characteristic of the inner plies or layers of the tube, the entire sheet may be impregnated with the solution. Also various alternatives may be made in the method of preparing the tubing. For example, the impregnated sheet may be dried completely before it is rolled into a tube on the mandrel 14 and then heated to a temperature of from 350° to 450° F.

Different impregnated solutions may also be used. In place of the methyl-ethyl-ketone the polystyrene may be placed in a water dispersion diluted to about 25% solids and about 10% dibutylphthalate added to the solution. The solution may also include about 0.2% Triton X–100, or other surface active agent, to aid in wetting of the glass fiber sheet. After the glass fiber sheet has been immersed in the dispersion, it may be removed therefrom and the excess liquid allowed to drain, after which the sheet is dried and subsequently rolled about the mandrel into a multi-ply tube and heated to a temperature from 400° to 450° F.

What is claimed is:

1. A porous tube for retaining active material in a lead-acid storage battery plate comprising a sheet of glass fiber material rolled about an edge thereof to form a porous tube having a plurality of layers, the outer layers being bonded together and the inner layers being unbonded to permit independent freedom in expansion or contraction thereof.

2. A porous tube for retaining active material in a lead-acid storage battery plate comprising a sheet of glass fiber material rolled about an edge thereof to form a porous tube having a plurality of layers, the outer layers being impregnated with a solution of a binder and being bonded together leaving the remaining inner layers unbonded to permit independent freedom in expansion or contraction thereof.

3. An article of manufacture according to claim 2 wherein said impregnating solution comprises polystyrene and methyl-ethyl-ketone.

References Cited in the file of this patent

UNITED STATES PATENTS

| | | |
|---|---|---|
| 1,243,371 | Willard | Oct. 16, 1917 |
| 2,168,366 | Slayter | Aug. 8, 1939 |
| 2,653,887 | Slayter | Sept. 29, 1953 |
| 2,653,986 | Phillipps | Sept. 29, 1953 |
| 2,711,982 | Straka | June 28, 1955 |
| 2,806,076 | Yamura et al. | Sept. 10, 1957 |